United States Patent [19]

Kraus, Sr.

[11] Patent Number: 4,532,568
[45] Date of Patent: Jul. 30, 1985

[54] THREE-PHASE LEAKAGE PROTECTION BY ELECTRONIC CONTROL

[76] Inventor: Arthur A. Kraus, Sr., 471 Scott St., Joliet, Ill. 60432

[21] Appl. No.: 462,083

[22] Filed: Jan. 28, 1983

[51] Int. Cl.³ .............................................. H02H 3/16
[52] U.S. Cl. ........................................ 361/42; 361/47; 361/50; 340/650
[58] Field of Search ........................ 361/42, 47, 48, 49, 361/50; 200/44; 324/51; 340/650, 651, 649

[56] References Cited

U.S. PATENT DOCUMENTS

| | | | |
|---|---|---|---|
| 3,286,129 | 11/1966 | Gagniere | 361/47 |
| 3,440,491 | 4/1969 | Tenenbaum et al. | 361/94 X |
| 3,515,942 | 6/1970 | Gordon | 361/49 |
| 3,665,252 | 5/1972 | Rogers, Sr. et al. | 361/50 |
| 3,705,507 | 12/1972 | Sanders et al. | 200/44 |
| 3,742,161 | 6/1973 | Lipschutz | 200/44 |
| 4,099,215 | 7/1978 | Parrier et al. | 361/42 |

Primary Examiner—Patrick R. Salce
Attorney, Agent, or Firm—Neuman, Williams, Anderson & Olson

[57] ABSTRACT

A system is provided for early detection of leakage currents through ground connections of loads such as three-phase motors connected to isolated secondary windings of supply transformers. An alarm device is energizable when leakage current is a small fraction of a predetermined value which might present a potential hazard, the point of energization being adjustable by an operator until the predetermined value is reached. Thereafter, it is adjustable only by a supervisor, after operation of a key switch. Circuitry is provided to obtain sensitive, stable and reliable operation.

2 Claims, 4 Drawing Figures

THREE-PHASE LEAKAGE PROTECTION BY ELECTRONIC CONTROL

This invention relates to an electronic control arrangement and more particularly to an arrangement which is particularly advantageous in controlling the supply of three-phase electrical power to motors or other loads. The arrangement protects equipment against damage and also protects operating personnel against dangerous conditions which might produce shocks. It is highly effective and reliable while being easy to install and use and readily and economically manufacturable. An important advantage of the arrangement is that leakage conditions can be detected and indicated at an early stage of development to permit remedial actions to be taken before serious damage can occur.

BACKGROUND OF THE INVENTION

It is known that single phase electrical supplies such as used in various residential, commercial and industrial applications can be designed to avoid shock hazards by departing from conventional practice and using a system which is isolated from ground. It is also known to provide circuitry for detecting leakage current between such an isolated system and ground. However, the systems which have been designed for single phase operation have not been suitable for operation in three-phase supply systems such as used in industrial applications. Moreover, the advantages of protection of three-phase systems and problems involved therewith have not been fully recognized and dealt with in the prior art.

SUMMARY OF THE INVENTION

This invention is based in part upon the recognition of important advantages obtainable from isolating three-phase supply systems from ground and was evolved with the general object of providing an arrangement for protection of three-phase electrical supply systems with respect to preventing damage and dangerous conditions which might result from leakage currents.

Another object of the invention is to provide an arrangement which is highly effective and reliable while being readily installed.

An important aspect of the invention is in the recognition that one of the problems involved with three-phase power supply systems is that the equipment generally uses a Y-type wiring with a common line which is well grounded producing an increased likelihood of breakdowns due to leakage as well as an increased danger with respect to shocks.

It is found that any small leakage developed in any phase of a system as, for example, in the winding of a motor, tends to become greater as time progresses, eventually producing a condition in which there may be a complete breakdown of insulation. The resistance of many types of insulators is a function of the moisture content, the resistance being decreased as the moisture content is increased. When even a small leakage current develops, it tends to cause heating to some extent and so long as the current is of relatively small magnitude, there is little problem. However, as the moisture content increases, the current also increases and the combined effects may reach a magnitude such as to change the chemical composition of the insulation and further reduce its resistance. Then as the resistance is reduced, the current is increased, accelerating the deterioration of the insulation until a point is reached at which the insulation may burn, in effect, changing from a composition which has a high resistivity to a carbon composition which has a quite low resistivity. At this point, the insulation may break down completely, producing very high short-circuit currents and possibly causing a fire as well as producing a condition which is very hazardous to personnel in the vicinity.

With a grounded neutral or common line as used with a Y-type wiring, it is desirable that the frames of all motors and other equipment be well grounded to minimize shock hazards. However, the likelihood of a breakdown is increased. If, for example, a leakage should develop between a portion of a motor winding and the grounded frame of the motor, a low resistance return path is provided through the frame which would not be provided if both the neutral and frame were not grounded. Another very important consideration is that the detection of a developing leakage condition is practically impossible when both the neutral and frame are well grounded.

In accordance with the invention, a control arrangement is provided for use in isolated three-phase systems supplying current to motors or other loads, the systems being isolated from ground as by using a delta-type connection with three supply lines between the load and the connections of three transformer secondary windings.

The control arrangement includes means for monitoring the magnitude of leakage currents between the supply lines and through a suitable ground connection which may be made to the frame of a motor, for example. By monitoring the magnitude of leakage currents, it is possible to detect the development of conditions which could lead to serious problems if no action were taken. Such detection may be accomplished at an early stage such as to allow appropriate remedial action to be taken.

The early detection of potential leakage problems is very important. An example is the case of a motor driving a municipal deep water well pump. When it is found that a leakage is developing in such a motor, steps may be taken to shut-down the motor and withdraw it from the well for inspection and servicing, or replacement, at a selected convenient time when it will have minimal effect with respect to disruption of services. If on the other hand, the potential problems were not detected, the leakage could lead to burn-out of the motor at a time when a serious disruption of service would occur and when it might take a long period of time to replace the motor. Moreover, conditions could develop which would create dangerous shock hazards.

Important features relate to the indication of leakage conditions in ways such as to create a high degree of probability that the leakage conditions will not be ignored and that corrective action will be taken. At the same time, the arrangement is such as to allow for variations in operating conditions and to insure against producing false alarms which might prevent proper attention to developing leakage conditions.

One feature relates to the energization of a signal lamp or other signal device when a leakage current is developed which has a value equal to a predetermined minor fraction of a predetermined leakage current value which is the lowest value which might indicate the need for possible remedial action. When the signal device is energized, the operator, i.e., the person charged with the daily duty of monitoring operation, may adjust a sensitivity control to obtain less sensitivity and to deenergize the signal device, provided that the leakage current is less than the predetermined value.

After so adjusting sensitivity, it may usually be the case that the signal device will remain deenergized indefinitely and even though the sensitivity has been decreased, it is safe to continue operation, the leakage current value being still less than the predetermined value which might indicate the need for possible remedial action. However, if the signal device is again energized and if it becomes necessary to make continued adjustments to obtain less and less sensitivity, the operator is alerted to the fact that a condition is developing which may require attention and he may well decide to take remedial action. If a stage is reached at which deenergization of the signal device is no longer possible through adjustment of sensitivity, the operator then knows that something must be done.

Another feature relates to the provision of means for overriding the control by the operator to insure a shutdown of the equipment when the leakage current reaches a second predetermined value which is higher than the first and which requires a shut-down.

A further feature relates to provisions for supervisory control to permit a supervisor to temporarily continue operation when appropriate, even though the leakage current has reached a potentially unsafe value. In the case of a municipal deep well water pump, for example, it may be desirable to continue operation until a replacement motor is available and ready for installation in the middle of the night when a service disruption will have minimal effect. To permit operation in such circumstances, controls are provided which are operable only by a supervisor who has a key. However, safeguards are still provided for preventing continued operation under conditions which are dangerous with respect to destruction of equipment or the safety of personnal.

Additional features of the invention relate to the circuitry used for monitoring leakage currents in a manner such as to obtain results which are highly accurate and also highly reliable with minimal sensitivity to transient field conditions and noise signals which might produce false indications and cause unnecessary and expensive shut-downs of equipment.

At least one and preferably two monitor units are provided for detecting the flow of leakage current and for controlling energization of indicating means from a power supply. Each monitor unit includes an amplifier which is preferably formed by a silicon-controlled rectifier connected in series with the indicating means and the power supply. The power supply preferably includes a step-down transformer energized from the secondary of an isolation transformer. The indicating means preferably includes a relay which may have contacts connected to control interruption of power to a load when a certain leakage current is detected. The indicating means may also include a signal light or other signal device for indicating when the leakage current reaches a predetermined lesser leakage current, for use in signalling a developing leakage current situation.

The input of the amplifier of each monitor unit is connected to a terminal which is connected through first coupling means to a plurality of the load circuit wires and is also connected through second coupling means to ground. The first coupling means preferably includes a plurality of diodes (three diodes in a three-phase system) and the second coupling means preferably comprises resistance means for controlling the current applied to the amplifier in response to grounding of one of the load circuit wires. The resistance means of the second coupling means is preferably adjustable to adjust the sensitivity of the system and may also comprise a fixed resistance means for limiting the current applied to the amplifier in response to direct grounding of one of the load circuit wires.

Stabilizing means are associated with the coupling means and are operative to inhibit energization of the indicating means in response to conditions other than the existence of a fault resistance below a certain value. The stabilizing means preferably includes means for applying a biasing signal between the input terminals of the amplifier and in a direction opposite the direction of the fault signal so that a fault signal of a certain amplitude must be applied before the indicating means will be energized. This arrangement also operates to inhibit energization of the indicating means in response to transient field conditions which might affect components of the circuitry. In a preferred embodiment, the stabilizing means further includes resistance and capacitance means operative to require a fault condition applied for a certain interval of time in order to cause energization of the indicating means.

Additional features of the invention relate to the provision of a comparatively simple and yet highly effective and reliable circuit arrangement incorporation such stabilizing means and operative for controlling energization of the indicating means.

This invention contemplates other objects, features and advantages which will become more fully apparent from the following detailed description taken in conjunction with the accompanying drawings.

DESCRIPTION OF A PREFERRED EMBODIMENT

Figure 3:
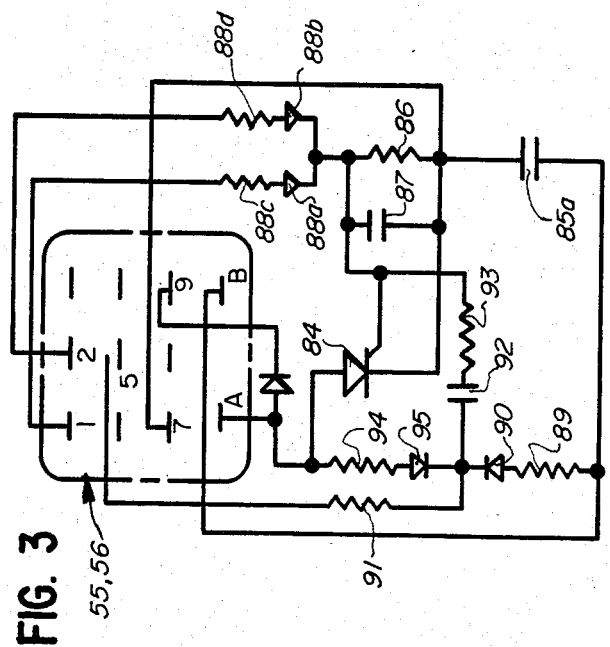
FIG. 3 is a schematic diagram of one of two circuit modules which are shown in block form in FIG. 2.

Reference numeral 10 generally designates a system for supplying three-phase electrical power to a motor 11. In the system 10 as illustrated, three-phase electrical supply lines 12, 13 and 14 are connected to primary windings 15, 16 and 17 of transformers 18, 19 and 20, the primary windings being connected in a Y configuration in the circuit as illustrated. The transformers 18, 19 and 20 have secondary windings 21, 22 and 23 which are connected to the motor 11 through lines 24, 25 and 26 and through a contactor circuit which is controllable by a leakage current sensing unit 27 of the invention. The secondary windings 21, 22 and 23 are isolated from ground and are connected in a delta configuration to lines 24, 25 and 26. Shields may be provided between the primary and secondary windings, such shields being connected to ground, as diagrammatically illustrated.

In the illustrated contactor circuit, the lines 24, 25 and 26 are connected to the motor 11 through contacts 28, 29 and 30 of a contactor 31 which also includes an operating coil 32 and a holding or interlock contact 33. The upper terminal of the operating coil 32 is connected through a normally closed stop switch contact 34 and is connectable through a normally open start switch contact 35 to the line 26, the holding contact 33 being connected in parallel with the start contact 35. The lower terminal of the operating coil 32 is connected through a contact 37 of a relay 38 (shown in FIG. 2) and through normally closed breaker contacts 39 and 40 to the line which is connected between contact 28 and the motor 11, that line being also connected through a normally open start switch contact 41 and to the line 26. As hereinafter described, the relay 38 with the unit 27 is energized to close the contact 37 prior to operation of the start switch contacts 35 and 41.

In the operation of the contactor circuitry, closure of the contacts 35 and 41, after energizing relay 38, causes energization of the contactor coil 32 to close the contacts 28, 29, 30 and 33 and after closure of such contacts, energization of the coil 32 is maintained through the contacts 28 and 33. The coil 32 may be deenergized by opening the stop contact 34 or may be automatically deenergized when either of the breaker contacts 39 or 40 is opened in response to excessive current through sensor elements 43 and 44.

The coil 32 may also be deenergized through the operation of circuitry of the sensing and control unit 27 which is operative to sense leakage currents between any two of the isolated lines 24, 25 and 26, such as may be developed through leakages between such lines and ground. The unit 27 may be preset to automatically deenergize the relay 38 and thereby open the contact 37 and deenergize the coil 32 to cause deenergization of the motor. Such automatic operation is effected when the resistance between the lines and ground is reduced below a safe value, to thereby protect against shock hazards and also to protect the motor 11 or other equipment from unnecessary damage. The unit 27 is also advantageous in providing warnings of impending problems in a manner such as to insure that corrective actions will be taken before conditions develop which endanger the lives of operating personnel or which would cause expensive damage to motors or other equipment.

Figure 1:
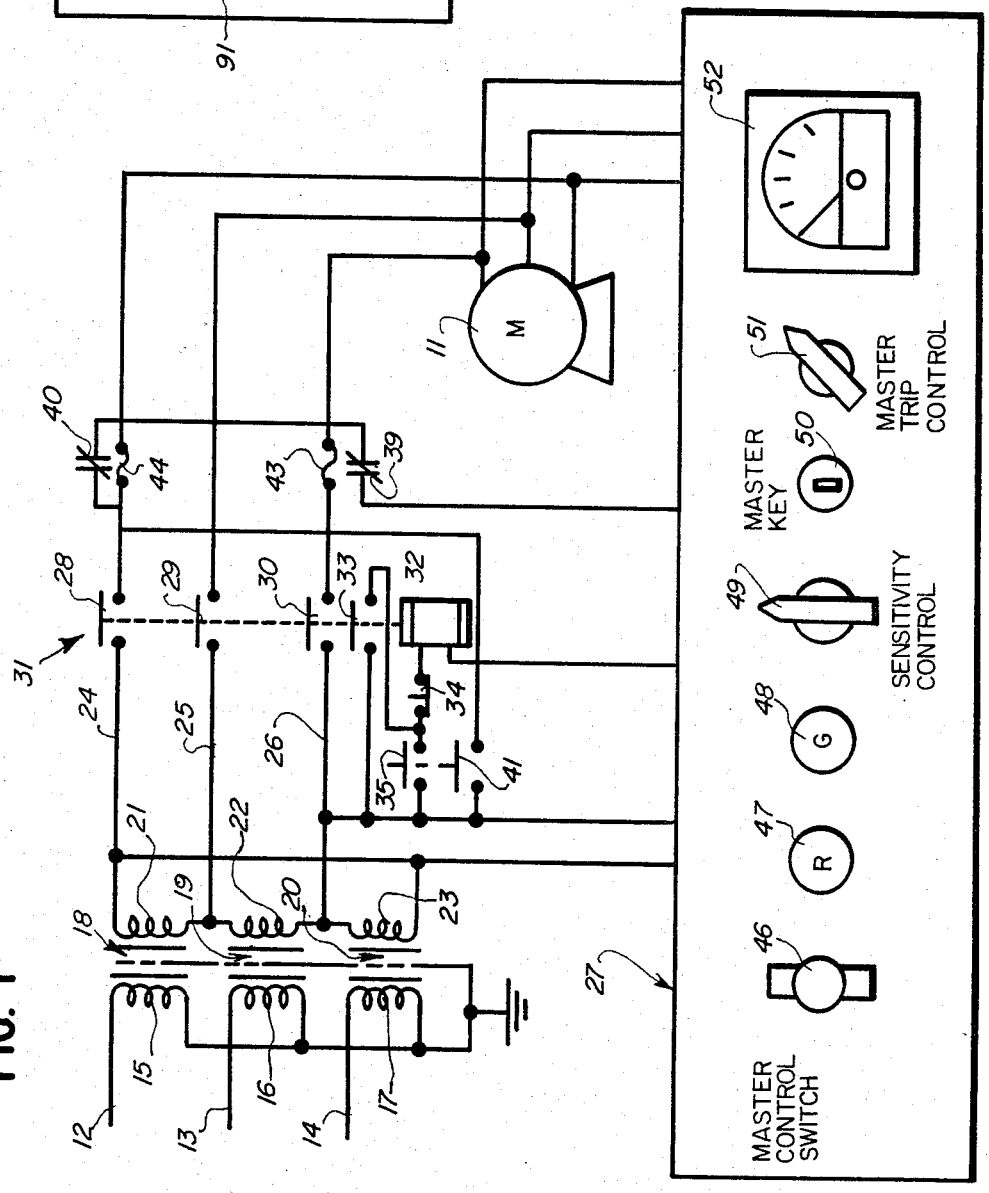
FIG. 1 is a schematic diagram of an electrical power distribution system with a leakage current sensing unit connected thereto, in accordance with the invention.

As shown diagrammatically in FIG. 1, the leakage current sensing and control unit 27 includes a front panel with controls and indicators, including a master control switch 46, a red signal light 47, a green indicating light 48, a sensitivity control 49, a master key switch 50, a master trip control 51 and a meter 52. In the operation of the system, the master control switch 46 may be operated to an on position, to effect energization of the relay 38. Then the start switch contacts 35 and 41 may be closed momentarily to cause energization of the motor 11 in the manner as above described.

If the leakage current is less than a predetermined value, the green light 48 will be energized but if, at any time, the leakage current should exceed a certain value, the red light 47 will become energized and the green light 48 will be deenergized.

The current required for energization of the red light is determined by the position of the sensitivity control 49 and in the normal operation of the system, the operator, i.e., the person who is assigned the duty of monitoring the operation of the meter 11, will initially adjust the control 49 to obtain a certain indication on the meter 52, which indicates the leakage current.

For example, the control 49 may be set to obtain an indication of 20 on the meter 52, having a full scale reading of 100. Then the red light 47 will be energized when the indication of the meter is on the order of 40 to 75. The sensitivity control 49 may be adjusted from time to time in response to changes in conditions. For example, during damp weather, the meter indication will tend to rise and when it is observed that the meter indication is rising or when the red light 47 becomes energized, the control 49 may be adjusted to again obtain an indication of 20.

However, if the leakage current should continue to rise, a condition will be reached in which adjustment of the sensitivity control 49 will no longer deenergize the red light 47. At this time, it is the responsibility of the operator to call in a supervisor who has a key for operating the switch 50. The supervisor may then operate the switch 50 and then adjust the master trip control 51 to permit continued operation of the motor 11.

At this time, however, two persons, the operator and the supervisor, are responsible for operation of the motor 11 and are well aware of the fact that there is a potential serious problem and although the supervisor may decide to temporarily continue operation of the motor 11, he or she is well advised to take immediate steps to ascertain the cause of the problem and effect a resolution.

It should be noted that if at any time, the leakage current should exceed certain higher values, the unit will operate automatically to deenergize the relay 38 and open the contact 37 to deenergize the motor 11.

Figure 4:
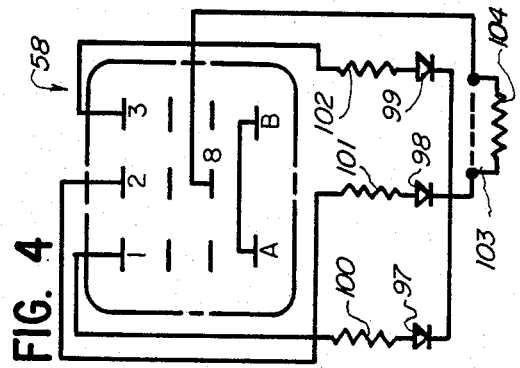
FIG. 4 is a schematic diagram of a connector or power divider module shown in block form in FIG. 1.
Figure 2:
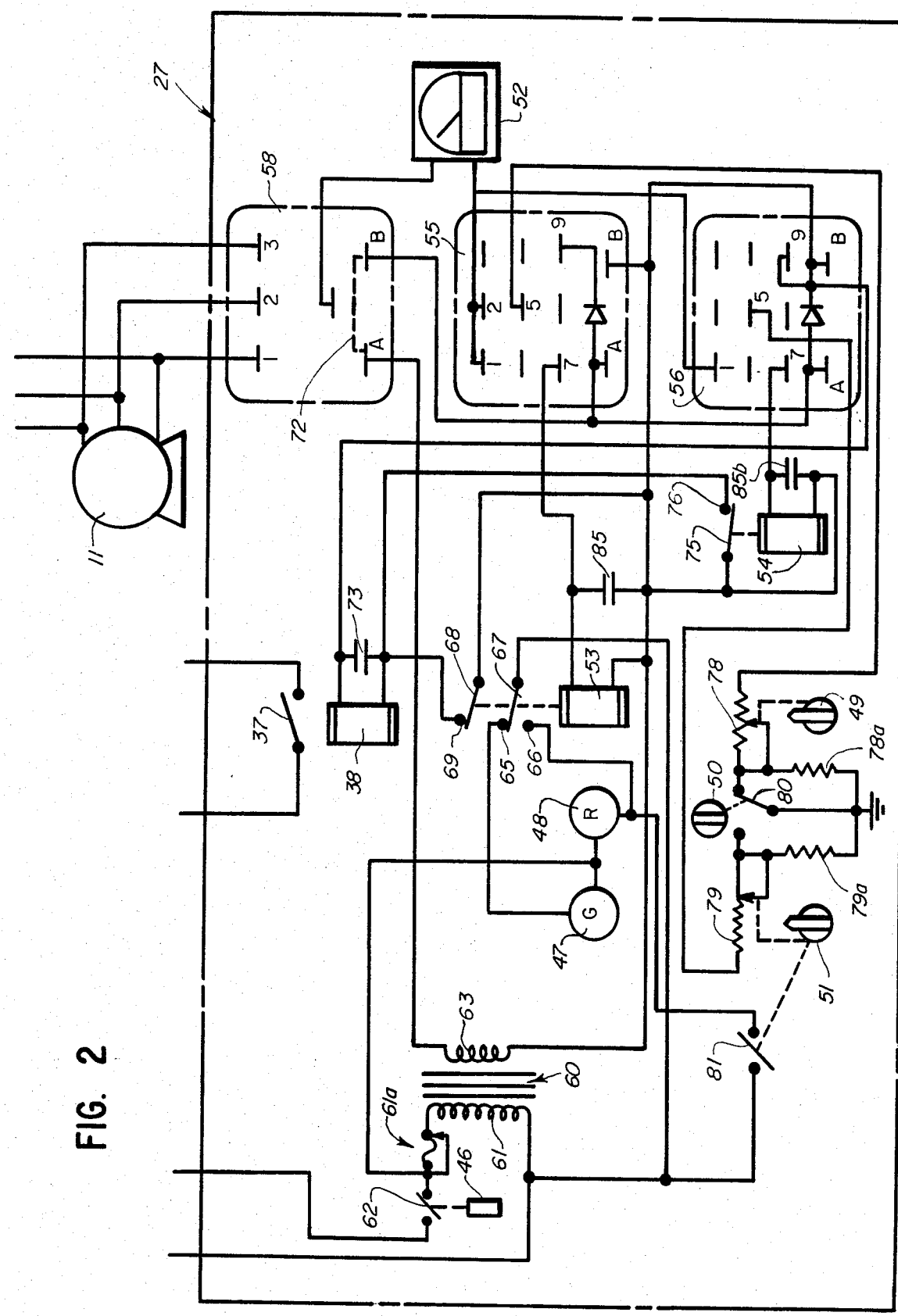
FIG. 2 is a schematic diagram of the leakage current sensing unit which is shown in block form in FIG. 1.

FIG. 2 is a circuit diagram of the unit 27, it being noted that the relay 38 with its contact 37 is part of the control unit 27 as indicated by broken lines in FIG. 1. In addition to the relay 38, a pair of relays 53 and 54 are provided which are respectively operated by a pair of circuit modules 55 and 56. Modules 55 and 56 are connected through the meter 52 to a power divider module 58 which is connected to the lines leading to the motor 11 in the arrangement as illustrated. Terminals to connectors to the circuit modules 55 and 56 and to the power divide module 58 are shown in FIG. 2 and the circuits of the modules are shown in FIGS. 3 and 4.

Power to the circuitry is applied from a transformer 60 which has a primary winding 61 connected to the lines 24 and 26 through a thermo-switch 61a and a contact 62. The contact 62 is operable by the master control switch 46.

The transformer 60 has a secondary winding 63 which may supply a voltage at a relatively low level, for example 24 volts, for operation of the relays 38, 53 and 54. The signal lights 47 and 48 may, however, be operative at higher voltages and, as shown, terminals thereof may be connected to the lower terminal of the primary winding 61 while the opposite terminals thereof may be respectively connected to fixed contacts 65 and 66 of the relay 53, engageable by a movable contact 67 thereof. When the relay 53 is deenergized, the contact 65 is engaged by the contact 67 to energize the green light 48 but when the relay 53 is energized, the contact 67 engages the contact 66 to energize the red light 47. Contact 67 is connected to the upper terminal of the primary winding 61 which is connected to the line 26.

To control energization of the relay 38 under certain conditions, the relay 53 has a second movable contact 68 which is connected to the lower terminal of the secondary winding 63 and which is engageable with a fixed contact 69 in the deenergized condition of the relay 53, contact 69 being connected to the upper terminal of the relay 38. The lower terminal of the relay 38 is connected to a No. 9 terminal of the module 56, the No.

9 terminal being connected through a rectifier diode within the module 56 to an "A" terminal thereof. The "A" terminal is connected through a heat sensing turn-off device 72 in the power divider module 58 to the upper terminal of the transformer secondary winding 63. Thus, with the relay 53 deenergized, rectified current is supplied to the relay 38. As shown, a capacitor 73 may be connected in parallel with the relay 38 to smooth out the current.

The relay 54 has a movable contact 75 which is engaged with a fixed contact 76 in the deenergized condition of the relay, contact 75 being connected to the lower terminal of the winding 63 and contact 76 being connected to the upper terminal of the relay 38. Thus, contacts 75 and 76 are connected in parallel with the contacts 68 and 69. Energization of both relays 53 and 54 is required to cause deenergization of the relay 38 once the master control switch contact 62 is closed.

The operation of the relay 53 is controlled from the current sensing module 55, the sensitivity of which is controlled by a potentiometer or adjustable resistor 78 which has a movable contact mechanically connected to the sensitivity control 49. The operation of the relay 54 is controlled by the module 56, the sensitivity of which is controlled by an adjustable potentiometer or resistor 79 which has a movable contact mechanically coupled to the master trip control knob 51. When the key switch 50 is not operated, a contact 80 thereof connects the movable contact of potentiometer 78 to ground, shorting out a resistor 78a in series with potentiometer 78. When the key switch 50 is operated, the contact 80 connects the movable contact of potentiometer 79 to ground, shorting out a resistor 79a in series with the potentiometer 79. Resistors 78a and 79a function to insure a complete shut down when leakage current exceeds a certain first value, regardless of the position of the key switch 50 and regardless of whether or not an operator or a superviser is present. A contact 81 is mechanically coupled to the control knob 51 and is operated to a closed position when the master trip control 51 is moved away from its maximum sensitivity position.

FIG. 2 shows diagrammatically the arrangement of terminals of connectors which interconnect the modules 55 and 56 with the relay and power supply circuitry also illustrated in FIG. 2. As shown, the connectors include terminals Nos. 1-9 and "A" and "B" terminals, only certain ones of the numbered terminals being used. FIG. 3 shows the connection of such connector terminals to the circuitry of the module 55 which may be substantially identical to that of the module 56.

In the module 55, the "A" terminal is connected to the anode of a silicon-controlled rectifier 84 which forms an amplifier device. The No. 7 terminal is connected to the cathode of the silicon-controlled rectifier 84 and with reference to the circuit of FIG. 2, it will be noted that with such connections, the relay 53 will be energized when the silicon-controlled rectifier 84 conducts. A rectified half-wave current may be applied to the relay 53 when the silicon-controlled rectifier 84 continues to conduct during a number of cycles of the alternating current. Preferably, as shown in FIG. 2, a capacitor 85 may be connected in parallel with the relay 53 to obtain a filtering action. A parallel capacitor 85a may be included in the module 55.

The silicon-controlled rectifier 84 provides an amplifier, the output terminals of which are formed by the anode and cathode thereof and the input terminals of which are formed by the gate and cathode thereof, the cathode being both an input terminal and an output terminal. The gate of the rectifier 84 is connected to the cathode thereof through a resistor 86 and a parallel capacitor 87 and is also connected to the No. 1 and No. 2 terminals through diodes 88a and 88b and resistors 88c and 88d, the No. 1 and No. 2 terminals being connected to the meter 52 as shown in FIG. 2. As hereinafter described, the meter 52 is coupled through the module 58 to the A.C. supply lines of the energizing circuit for the motor 11.

The cathode of the rectifier 84 is coupled to ground through a path which includes the relay 53, connected between the number 7 and "B" terminal (FIG. 2), a resistor 89, a diode 90, a fixed resistor 91 and the potentiometer or adjustable resistor 78. When a fault resistance is developed between ground and the supply line, current may flow in a direction such as to cause the potential of the gate of the rectifier 84 to move in a positive direction relative to the cathode thereof.

An important feature is in the provision of stabilizing means for inhibiting energization of one or the other of the relays 53 or 54 in response to conditions other than the existence of a fault resistance below a certain value. In the illustrated circuit, a capacitor 92 is connected in series with a resistor 93 between the cathode of the diode 90 and the gate of the rectifier 84 and a resistor 94 is connected in series with a diode 95 between the cathode of the diode 90 and the "A" terminal which is connected to the upper terminal of the secondary winding 63 (FIG. 2). Capacitor 92 and resistor 93 operate to provide a bleed-off circuit to apply a biasing signal and to prevent the rectifiers 84 from being paralyzed in an "on" condition.

Resistor 94 and diode 95 cooperate with resistor 89 and diode 90 to establish a neutral point to the capacitor 92. When the "A" terminal is positive relative to the "B" terminal, current may flow through the resistor 94, diode 95, capacitor 92, resistor 93, resistor 86 and relay 53 to the "B" terminal. Through such current flow, the capacitor 92 may be charged to a voltage substantially equal to the peak of the voltage developed across the winding 63, the left-hand terminal of the capacitor 92 being positive and the right-hand terminal being negative.

Since the left-hand terminal of the capacitor 92 is connected through resistors 91 and 78 to ground, the right-hand terminal thereof is placed at a negative potential relative to ground, and through the resistor 93, a negative bias relative to ground is applied to the gate of the rectifier 84. This bias signal inhibits firing of the rectifier 84 in response to the existence of electrostatic or magnetic fields or other conditions which might otherwise operate to fire the rectifier 94 even when no fault condition is established. However, when a fault condition is established, the capacitor 92 may be gradually discharged and the capacitor 87 may be gradually charged until the gate is placed at a positive potential relative to the cathode such as to cause firing of the rectifier 84. The response is relatively slow and several seconds may be required to cause firing of the rectifier 84. Thus, the circuit prevents nuisance tripping and false alarms.

The sensitivity of the system is readily adjusted by adjustment of the resistor 78 while the fixed resistor 91 is always in the coupling path to ground, to protect against excessive current from a low ohm or solid ground.

The circuit of the power divider or connector module 58 is shown in FIG. 4. Three rectifier diodes 97, 98 and 99 are connected in series with three resistors 100, 101 and 102 between a circuit point 103 and No. 1, No. 2 and No. 3 connector terminals which are connected to the terminals of motor 11 or to lines leading thereto. When, for example, the phase is such that the terminal No. 1 is positive relative to the No. 2 and No. 3 terminals, current may flow from the No. 1 terminal, through resistor 100 and diode 97 to the circuit point 103. Circuit point 103 is connectable to the No. 8 terminal, either directly or through a dropping resistor 104, depending upon whether the supply voltage is 220 volts or a higher voltage. The No. 8 terminal is connected to the meter 52 so that leakage current may flow through the meter 52, the current sensing circuitry in module 55 and the potentiometer 78 to ground and then from ground through any existing leakage paths to the terminals 105 and 106. Current flows from the No. 2 and No. 3 in a similar fashion as they become positive. The current flow through meter 52 and module 55 is thus inversely proportional to the sum of the resistance of one of the resistors 101–103, the resistance between the No. 1 and No. 2 terminals and the No. 5 terminals of the module 55 and the average leakage resistance between ground and terminals 104–106. A connection is made only to the No. 1 terminal so that diode 88b and resistor 88d of module 56 are not in the circuit. Any external capacitor 85b may be connected in parallel with relay 54, as shown in FIG. 2. It is noted that the internal diodes 88a and 88b and internal resistors 88c and 88d are in the path of flow of leakage current through the module 55 with the connections as shown. Such internal diodes and resistors are desirably included in the modules 55 and 56 to permit them to be used in single phase circuits, without requiring the module 58 which is used only for three phase operation. When a module is used in a single phase circuit the No. 1 and No. 2 terminals may be connected to any two wires of a three wire system, for example.

In the module 55 as illustrated in FIG. 3, a diode 108 is shown connected between the "A" terminal and the No. 9 terminal. This diode 108 is not used in the module 55 when connected as shown in FIG. 2, but a similar diode is provided in the module 56 for completing a circuit to the relay 38.

The operation of the module 56 is substantially the same as that of the module 55, module 56 being brought into operation when the key switch contact 80 is closed. As previously indicated, this arrangement is provided for use in a situation in which there has been a developing leakage condition causing the module 55 to effect continuous energization of the relay 53 and continuous energization of the red lamp 47. When this happens, the operator has the duty of calling in his supervisor and the supervisor with a suitable key may operate the key switch and then adjust the sensitivity control potentiometer 79 for the module 56. The red lamp 47 is always energized when the key switch is operated. This arrangement is provided for emergency situations in which even though there may be a serious leakage problem under development, it may nevertheless be desirable to temporarily continue operation of the equipment until a time is found for convenient attention to the problem without immediate disruption of service and the very bad consequences which might result therefrom. At the same time, the arrangement insures that responsible persons are warned of the developing leakage problem. An additional safeguard is provided in that regardless of the position of the key switch and regardless of whether an operator or a supervisor is giving attention to the operation of the system, the circuitry will function through one or the other of the resistors 78a or 79a to cause a conplete shut down when the leakage current exceeds a certain maximum limit value. Preferably, the resistors 78a and 79a have different values to compensate for the differences in sensitivity obtained, depending upon the position of the key switch, and to obtain a complete shut down at about the same maximum limit value.

It will be understood that modifications and variations may be effected without departing from the spirit and scope of the novel concepts of this invention.

I claim:

1. A monitor unit for an electrical power distribution system which includes isolation transformer means having primary winding means for connection to an AC supply and secondary winding means for connection to wires of a load circuit, said monitor unit comprising a step-down transformer including a primary winding for connection to said AC supply and including a secondary winding having first and second terminals, a silicon-controlled rectifier having cathode and anode electrodes and a gate electrode, means connecting one of said anode and cathode electrodes to said first terminal of said secondary winding, relay means coupled between the other of said anode and cathode electrodes and said second terminal of said secondary winding, resistance means coupled between said gate electrode and said cathode electrode, coupling circuit means for coupling said gate electrode to wires of a load circuit and for coupling said cathode electrode to a ground connection for flow of leakage current through said resistance means, stabilizing means associated with said coupling means and including capacitor means, resistance means connected in series with said capacitor means to form a series circuit, means connecting one terminal of said series circuit to said gate electrode, means connecting the other terminal of said series circuit to said ground connection, diode means for coupling said capacitor means through said diode means to said first and second terminals of said secondary winding to charge said capacitor means and to place said one terminal of said series circuit at a negative potential relative to the other terminal thereof, thereby to provide a negative bias at said gate electrode.

2. In a monitor unit as defined in claim 1, said diode means comprising a pair of diodes and a pair of resistors connected in series with said diodes to provide a pair of diode-resistor circuits, one of said diode-resistor circuits being connected between said other terminal of said series circuit and said first terminal of said secondary winding and the other of said diode-resistor circuits being connected between said other terminal of said series circuit and said second terminal of said secondary winding.

* * * * *